United States Patent
Harada et al.

(10) Patent No.: US 9,623,704 B2
(45) Date of Patent: Apr. 18, 2017

(54) IMAGE FORMING APPARATUS AND LOCKABLE SWIVEL CASTER WHEEL ASSEMBLY

(71) Applicant: KYOCERA Document Solutions Inc., Osaka (JP)

(72) Inventors: Kaori Harada, Osaka (JP); Hideaki Doyo, Osaka (JP); Noriko Masuta, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/264,332

(22) Filed: Sep. 13, 2016

(65) Prior Publication Data

US 2017/0072743 A1    Mar. 16, 2017

(30) Foreign Application Priority Data

Sep. 15, 2015 (JP) ................. 2015-181538

(51) Int. Cl.
| | | |
|---|---|---|
| *B60B 33/00* | (2006.01) | |
| *B60B 33/06* | (2006.01) | |
| *B60B 33/04* | (2006.01) | |
| *G03G 21/16* | (2006.01) | |

(52) U.S. Cl.
CPC .......... *B60B 33/04* (2013.01); *B60B 33/0002* (2013.01); *G03G 21/1619* (2013.01)

(58) Field of Classification Search
CPC ................ B60B 33/04; B60B 33/0005; B60B 33/0055; B60B 33/0057; B60B 33/006; B60B 33/0065; B60B 33/0068; B60B 33/0073; B60B 33/0076; B60B 33/02; B60B 33/021; B60G 2200/445; B62B 3/001; B62B 2301/00; B62B 2301/04; B62B 2301/046; B62B 2301/0465; G03G 21/1619; Y10T 16/195; Y10T 16/196; Y10T 16/191; Y10T 16/193
See application file for complete search history.

(56) References Cited

U.S. PATENT DOCUMENTS

| | | | | |
|---|---|---|---|---|
| 2,251,567 | A * | 8/1941 | Gould | ..................... B60B 33/02 16/35 R |
| 2,425,675 | A * | 8/1947 | Graff | ..................... B60B 33/04 16/19 |
| 2,709,828 | A * | 6/1955 | Noelting | ............... B60B 33/021 16/35 R |
| 3,828,392 | A * | 8/1974 | Bolger | ..................... B60B 33/02 16/18 R |

(Continued)

FOREIGN PATENT DOCUMENTS

JP    2001-233002 A    8/2001

*Primary Examiner* — Chuck Mah
(74) *Attorney, Agent, or Firm* — Stein IP, LLC

(57) ABSTRACT

An image forming apparatus of the present disclosure is provided with an apparatus main body, a caster, and a cover member. The caster movably supports the apparatus main body. The cover member is mounted to a side surface of the apparatus main body. The caster includes a wheel and a main body portion that swivelably supports a rotation shaft of the wheel. A nut portion is provided integrally with an upper part of the main body portion. A swiveling restriction portion that restricts swiveling of the nut portion is formed integrally with the cover member.

6 Claims, 4 Drawing Sheets

(56) References Cited

U.S. PATENT DOCUMENTS

| | | | | |
|---|---|---|---|---|
| 3,924,292 A * | 12/1975 | Christensen | B60B 33/02 | 16/35 D |
| 4,028,773 A * | 6/1977 | Morgan | B60B 33/02 | 16/35 D |
| 4,246,677 A * | 1/1981 | Downing | B60B 33/02 | 16/35 R |
| 4,309,791 A * | 1/1982 | Aulik | A61G 1/04 | 16/35 R |
| 4,336,629 A * | 6/1982 | Jarvis, Jr. | B60B 33/0078 | 16/35 R |
| 4,723,633 A * | 2/1988 | Duncan | E04G 5/02 | 16/19 |
| 5,457,849 A * | 10/1995 | Branson | B60B 33/04 | 16/19 |
| 5,558,027 A * | 9/1996 | Williams | B60B 33/06 | 109/45 |
| 5,745,951 A * | 5/1998 | Waner | B60B 33/0007 | 16/31 R |
| 5,765,092 A * | 6/1998 | Yoshiuchi | G03G 15/652 | 271/242 |
| 5,983,614 A * | 11/1999 | Hancock | A01D 75/28 | 16/35 R |
| 6,055,704 A * | 5/2000 | Leibman | B60B 33/06 | 16/32 |
| 6,094,846 A * | 8/2000 | Feller | B60B 33/0002 | 16/35 D |
| 7,350,269 B2 * | 4/2008 | Dominic | B60B 33/0002 | 16/19 |
| 7,546,908 B2 * | 6/2009 | Chang | A45C 5/145 | 16/35 R |
| 8,819,894 B2 * | 9/2014 | Hamasaki | B60B 33/0086 | 16/35 R |
| 2007/0169307 A1 * | 7/2007 | Yu | B60B 33/04 | 16/30 |
| 2007/0204429 A1 * | 9/2007 | Cheng | B60B 33/0005 | 16/35 R |
| 2009/0106897 A1 * | 4/2009 | Harrow | A47C 19/024 | 5/200.1 |
| 2010/0308097 A1 * | 12/2010 | Martin | B65H 29/008 | 226/174 |
| 2011/0127741 A1 * | 6/2011 | Araya Moreno | B60B 33/0005 | 280/93.513 |
| 2015/0224823 A1 * | 8/2015 | Turturro | A61G 7/05 | 5/510 |

* cited by examiner

IMAGE FORMING APPARATUS AND LOCKABLE SWIVEL CASTER WHEEL ASSEMBLY

INCORPORATION BY REFERENCE

This application is based upon and claims the benefit of priority from the corresponding Japanese Patent Application No. 2015-181538 filed on Sep. 15, 2015, the entire contents of which are incorporated herein by reference.

BACKGROUND

The present disclosure relates generally to an image forming apparatus, and relates particularly to an image forming apparatus provided with a caster that movably supports a main body of the apparatus.

Conventionally, there is known an image forming apparatus provided with a caster that movably supports a main body of the apparatus and is capable of changing a height of the main body of the apparatus. The caster includes, for example, a wheel, a main body portion that swivelably supports a rotation shaft of the wheel, a bolt portion that is fastened to the main body portion and extends in an up-and-down direction, and a nut that is movable in the up-and-down direction along the bolt portion and supports the main body of the apparatus.

In such an image forming apparatus provided with a caster, the nut is rotated with respect to the bolt portion so as to be moved in the up-and-down direction, and thus a height of the main body of the apparatus can be changed.

SUMMARY

An image forming apparatus according to a first aspect of the present disclosure is provided with an apparatus main body, a caster, and a cover member. The caster movably supports the apparatus main body. The cover member is mounted to a side surface of the apparatus main body. The caster includes a wheel and a main body portion that swivelably supports a rotation shaft of the wheel. A nut portion that has a polygonal shape in a planar view is provided integrally with an upper part of the main body portion, and a swiveling restriction portion that restricts swiveling of the nut portion is formed integrally with the cover member.

Still other objects of the present disclosure and specific advantages provided by the present disclosure will be made further apparent from the following description of an embodiment.

DETAILED DESCRIPTION

Figure 1:
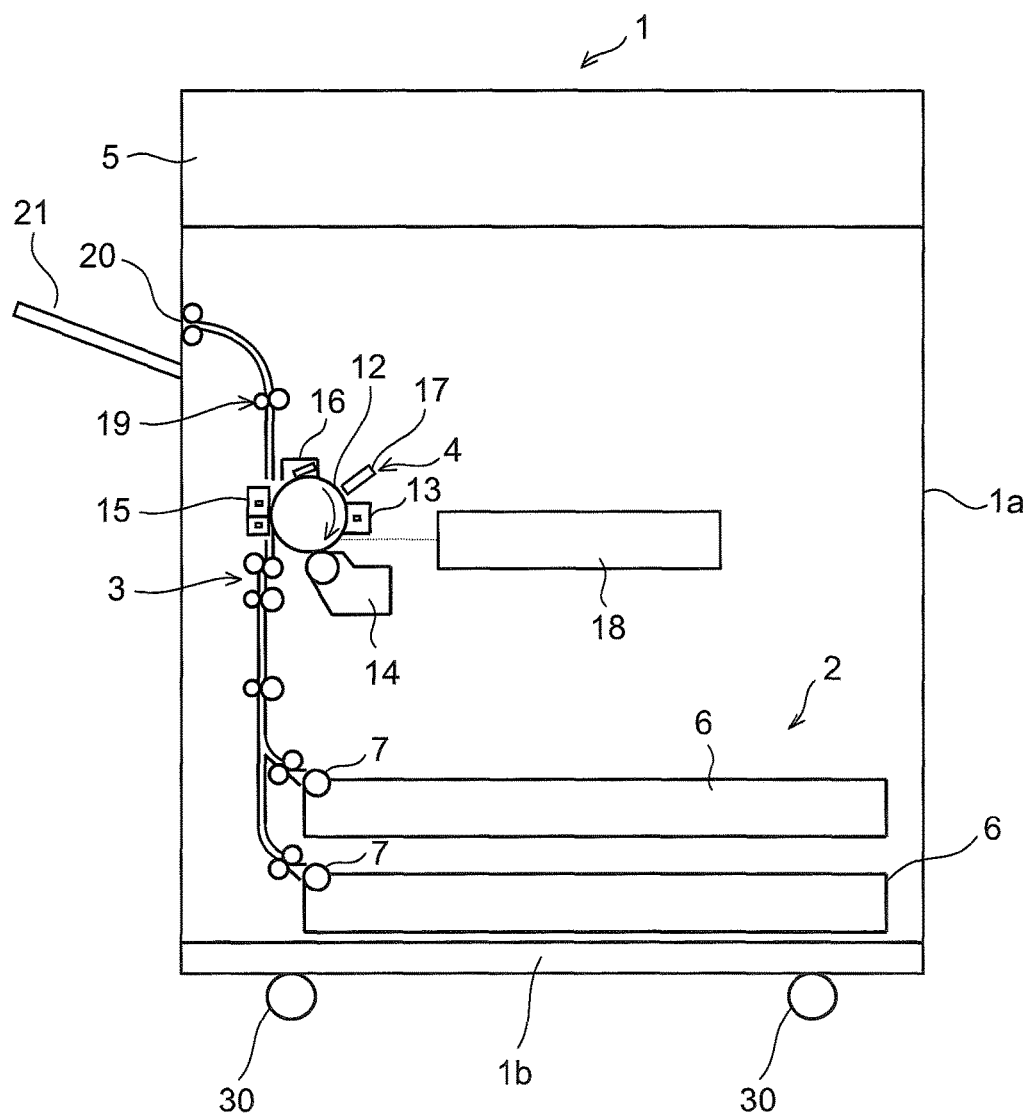
FIG. 1 is a diagram showing a schematic configuration of an image forming apparatus of one embodiment of the present disclosure.

The following describes an embodiment of the present disclosure with reference to the appended drawings.

With reference to FIG. 1 to FIG. 7, a description is given of an image forming apparatus 1 according to one embodiment of the present disclosure. The image forming apparatus 1 is a monochrome copy machine, and is provided with a paper feed portion 2 that is provided at a lower part of an apparatus main body 1a, a paper sheet conveyance portion 3 that is provided on the left of the paper feed portion 2 so as to be directed to an upper side, an image forming portion 4 that is provided on the right of the paper sheet conveyance portion 3, and an image reading portion 5 that is provided at an upper part of the apparatus main body 1a.

The paper feed portion 2 is provided with a plurality of paper feed cassettes 6 in each of which paper sheets are housed, and is configured so that, by a rotation operation of a paper feed roller 7, the paper sheets are securely fed out one by one from a selected one of the paper sheet cassettes 6 to the paper sheet conveyance portion 3.

At the paper sheet conveyance portion 3, a paper sheet fed out from any one of the paper feed cassettes 6 is conveyed toward the image forming portion 4. The image forming portion 4 is to form a prescribed toner image on a paper sheet by an electrophotographic process, and is provided with a photosensitive member 12 that is an image carrier which is axially supported so as to be rotatable in a prescribed direction (a clockwise direction in FIG. 1) and units provided around the photosensitive member 12 along a rotation direction thereof, which are a charging unit 13, a developing unit 14, a transfer unit 15, a cleaning unit 16, and a static eliminating unit 17.

The charging unit 13 applies a prescribed electric potential to a surface of the photosensitive member 12 so that the surface of the photosensitive member 12 is uniformly charged. Then, by a laser beam from a laser scanning unit 18 based on image data of an original document read by the image reading portion 5, an electrostatic latent image is formed on the photosensitive member 12. Next, by the developing unit 14, toner is supplied onto the photosensitive member 12, and thus a toner image is formed on the surface of the photosensitive member 12. By the transfer unit 15, the toner image is transferred on a paper sheet supplied between the photosensitive member 12 and the transfer unit 15.

The paper sheet on which the toner image has been transferred is conveyed from the image forming portion 4 toward a fixing roller pair 19. The fixing roller pair 19 is composed of a heating roller and a pressing roller that is pressed against the heating roller, and heats the paper sheet in a state of being sandwiched between the heating roller and the pressing roller so that the toner image is fixed on the paper sheet. By an ejection roller pair 20, the paper sheet on which the toner image has been fixed is ejected to a paper sheet ejection portion 21.

In preparation for subsequent image formation, toner remaining on the surface of the photosensitive member 12 is removed by the cleaning unit 16, and a residual electric charge on the surface of the photosensitive member 12 is removed by the static eliminating unit 17.

At each of four corners of a lower part frame 1b of the apparatus main body 1a, a caster 30 is provided that movably supports the apparatus main body 1a.

Figure 2:
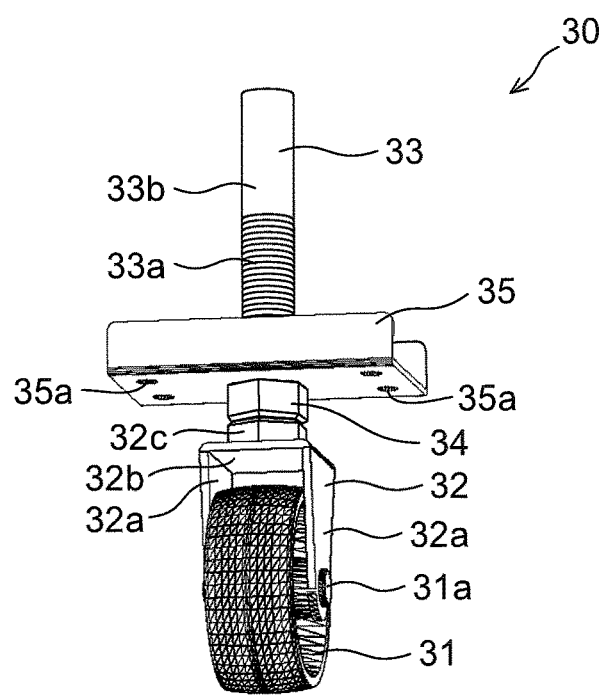
FIG. 2 is a perspective view showing, from a lower side, a structure of a caster of the image forming apparatus of one embodiment of the present disclosure.

As shown in FIG. 2, the caster 30 is composed of a wheel 31, a main body portion 32 that swivelably supports a rotation shaft 31a of the wheel 31, a bolt portion 33 that is fastened to an upper part of the main body portion 32 and extends in an up-and-down direction, a nut 34 that is rotatably mounted around the bolt portion 33, and a support member 35 that is placed on the nut 34.

The main body portion 32 has a pair of side surface portions 32a that function as a bearing of the rotation shaft 31a and an upper surface portion 32b that connects the pair of side surface portions 32a to each other, and is formed in a substantially U-shape. A nut portion 32c that has a polygonal (herein, hexagonal) outer shape in a planar view is fastened by welding or the like to an upper surface of the upper surface portion 32b. A screw thread is formed on an inner peripheral surface of the nut portion 32c. The nut portion 32c may be provided integrally with the main body portion 32 by a method other than welding.

The bolt portion 33 is composed of a screw portion 33a having a screw thread formed thereon and a non-screw portion 33b having no screw thread formed thereon, which is disposed on an upper side of the screw portion 33a. A lower end part of the screw portion 33a of the bolt portion 33 is fastened by screwing to the nut portion 32c of the main body portion 32. The upper surface portion 32b of the main body portion 32 has no through hole formed therethrough, and the bolt portion 33 is screwed in tightly to such an extent as to come in contact with the upper surface portion 32b of the main body portion 32 and thus is fastened firmly to the main body portion 32.

Figure 3:
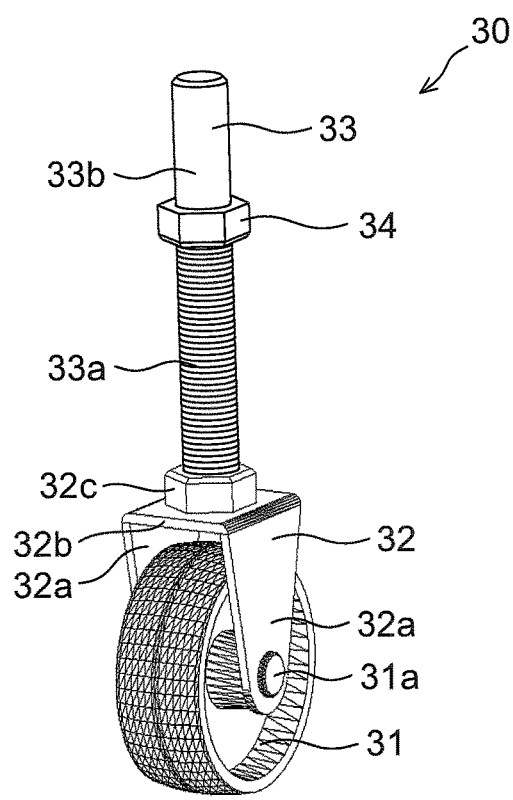
FIG. 3 is a perspective view showing, from an upper side, a structure of the caster of the image forming apparatus of one embodiment of the present disclosure, which excludes a support member, and is a diagram showing a state where a nut is disposed at an uppermost part in a prescribed region.
Figure 4:
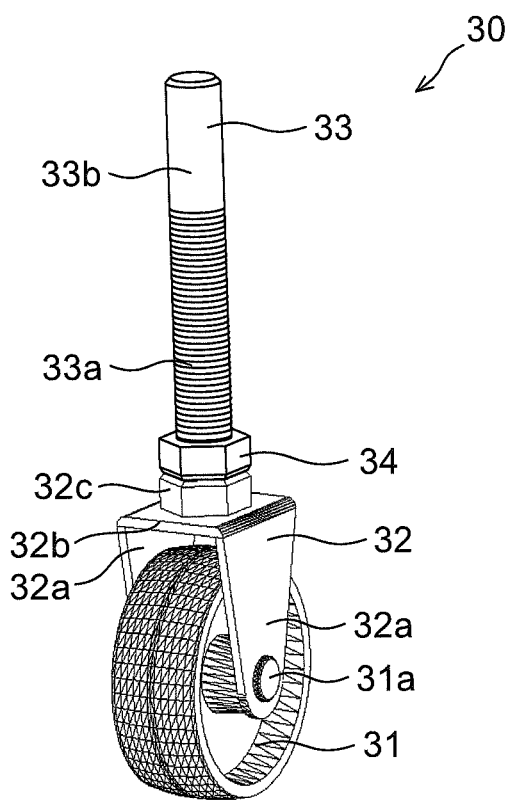
FIG. 4 is a perspective view showing, from the upper side, the structure of the caster of the image forming apparatus of one embodiment of the present disclosure, which excludes the support member, and is a diagram showing a state where the nut is disposed at a lowermost part in the prescribed region.

The nut 34 supports the apparatus main body 1a via the support member 35 and is movable by rotation in the up-and-down direction along the bolt portion 33. Furthermore, as shown in FIG. 3 and FIG. 4, the nut 34 is movable in the up-and-down direction within a region (prescribed region) extending from an uppermost part of the screw portion 33a of the bolt portion 33 to such an extent as to come in contact with the nut portion 32c of the main body portion 32.

The nut 34 is fastened to the uppermost part of the screw portion 33a (an uppermost part in the prescribed region) and thus is fastened firmly to the bolt portion 33. Furthermore, the nut 34 is fastened to a position (a lowermost part in the prescribed region) at which the nut 34 comes in contact with the nut portion 32c of the main body portion 32 and thus is fastened firmly to the bolt portion 33. By disposing the nut 34 at the uppermost part or the lowermost part in the prescribed region, a height of the apparatus main body 1a can be set in two stages.

Figure 5:
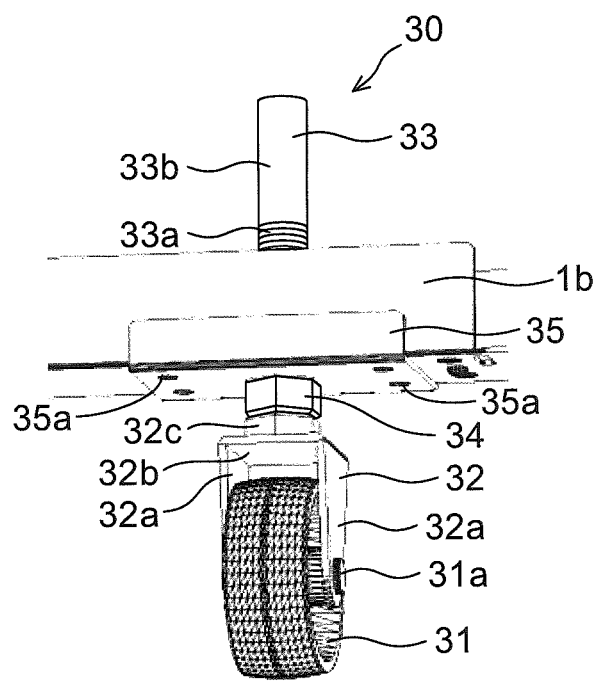
FIG. 5 is a perspective view showing, from the lower side, a state where a lower part frame of an apparatus main body is disposed on the support member of the caster of the image forming apparatus of one embodiment of the present disclosure.

As shown in FIG. 2, the support member 35 is formed by bending sheet metal into a U-shape. A through hole (not shown) having a size enough to allow passage of the bolt portion 33 and not enough to allow passage of the nut 34 is formed through a center part of the support member 35. Furthermore, as shown in FIG. 5, a plurality of mounting holes 35a for fastening the support member 35 with a screw to the lower part frame 1b of the apparatus main body 1a are formed through the support member 35. The support member 35 is not fastened to the bolt portion 33 nor to the nut 34. Thus, in a state where the support member 35 is fastened to the lower part frame 1b of the apparatus main body 1a, the wheel 31 can swivel with respect to the apparatus main body 1a.

In a case of assembling the caster 30 of this embodiment, the nut 34 is mounted around the screw portion 33a of the bolt portion 33. Then, the bolt portion 33 around which the nut 34 has been mounted is fastened by screwing to the nut portion 32c of the main body portion 32. After that, the non-screw portion 33b and the screw portion 33a of the bolt portion 33 are inserted into the through hole (not shown) of the support member 35, and then the support member 35 is placed on the nut 34. The caster 30 is assembled is this manner.

Figure 6:
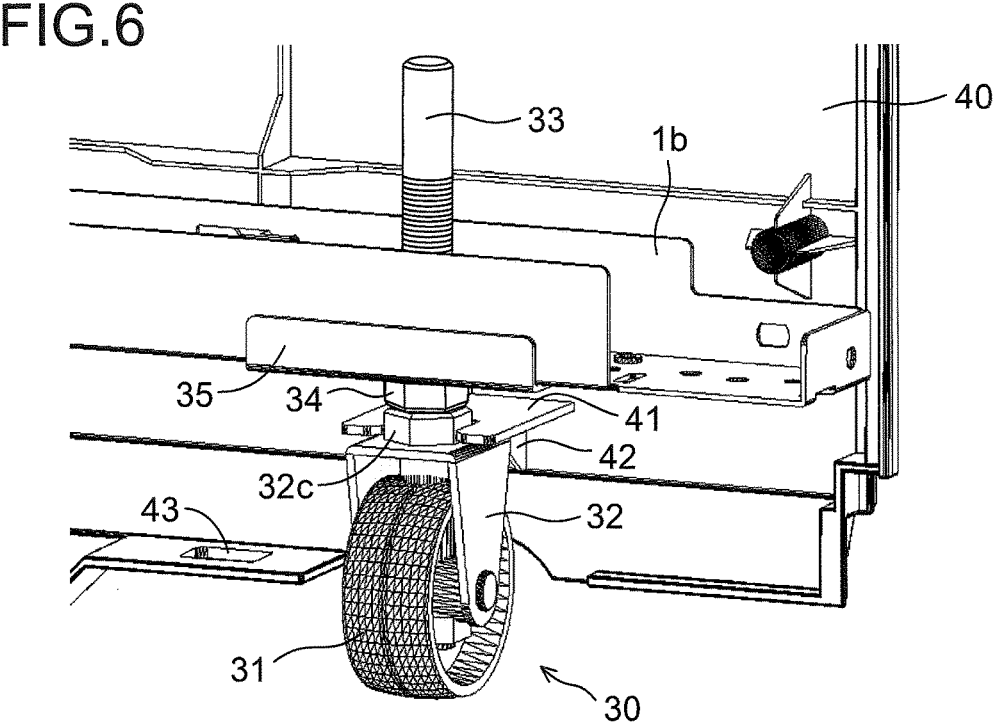
FIG. 6 is a perspective view showing, from the upper side, a state where side surfaces of a nut portion of the caster of the image forming apparatus of one embodiment of the present disclosure are held from both sides by a swiveling restriction portion of a cover member.

As shown in FIG. 6, a resinous cover member (first cover member) 40 is mounted to each of four surfaces of the apparatus main body 1a. On each of two opposed ones of the cover members 40, at two positions on a prescribed surface thereof, a swiveling restriction portion 41 that restricts swiveling of the nut portion 32c of the caster 30 is formed integrally with the cover member 40. The swiveling restriction portion 41 protrudes from the cover member 40 towards an inner side of the apparatus main body 1a and is reinforced with a plurality of support ribs 42. Furthermore, the swiveling restriction portion 41 is formed in such a substantially U-shape as to hold, from both sides, side surfaces of the nut portion 32c of the caster 30.

Figure 7:
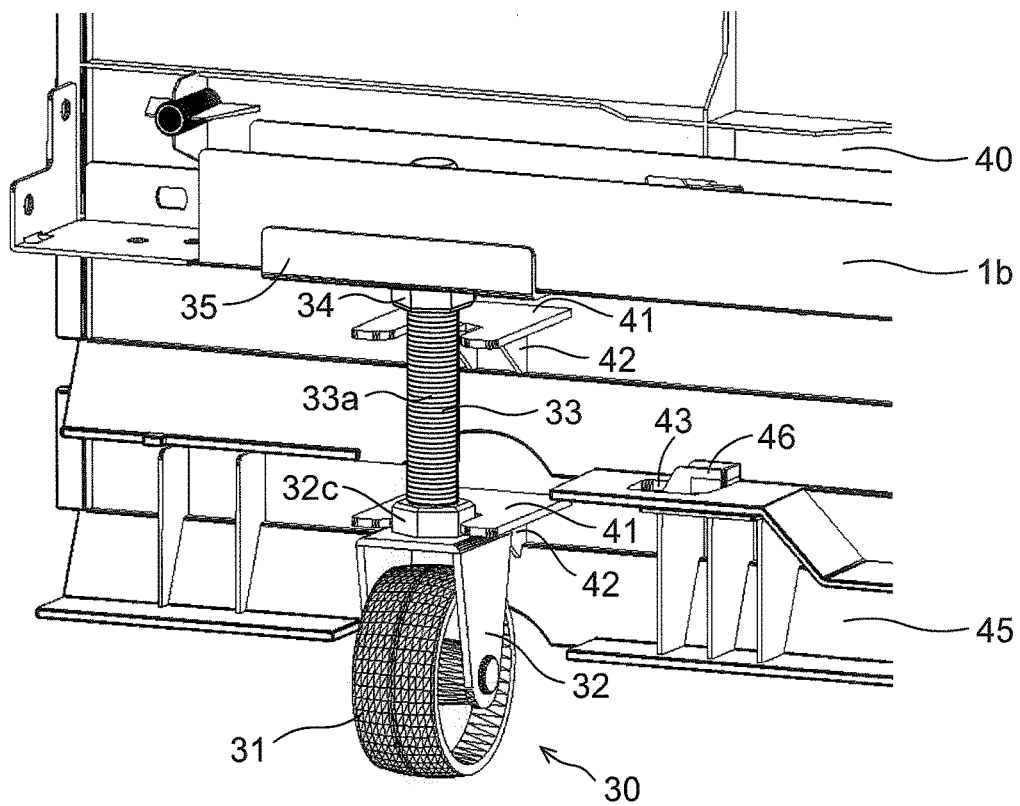
FIG. 7 is a perspective view showing, from the upper side, a state where an extension cover member is provided below the cover member of the image forming apparatus of one embodiment of the present disclosure.

When, in a state where the nut 34 is disposed at the uppermost part of the screw portion 33a (the uppermost part in the prescribed region), the cover member 40 is mounted to the apparatus main body 1a, the main body portion 32 and the bolt portion 33 of the caster 30 are undesirably exposed from below the cover member 40, degrading the appearance of the image forming apparatus 1. For this reason, as shown in FIG. 7, a resinous extension cover member (second cover member) 45 is provided below the cover member 40.

The extension cover member 45 is provided with engagement pieces 46 that fit respectively into engagement holes 43 that are provided at a lower part of the cover member 40. The engagement pieces 46 are fitted respectively into the engagement holes 43, and thus the extension cover member 45 is mounted to the lower part of the cover member 40. Furthermore, at prescribed positions on the extension cover member 45 (positions below the swiveling restriction portions 41 formed integrally with the cover member 40), similarly to the cover member 40, another swiveling restriction portion 41 that restricts swiveling of the nut portion 32c of the caster 30 is formed integrally with the extension cover member 45.

In a case where the image forming apparatus 1 of this embodiment is installed at a prescribed location, in a state where the cover member 40 is not mounted to the apparatus main body 1a so that the wheel 31 can swivel with respect to the apparatus main body 1a, the image forming apparatus 1 is transported to the location at which the image forming apparatus 1 is to be installed. Then, after the four casters 30 are aligned to be oriented to a common direction, the cover member 40 (or both of the cover member 40 and the extension cover member 45) is mounted to the each side surface of the apparatus main body 1a so that the casters 30 are prevented from swiveling. Thus, a movement direction of the image forming apparatus 1 after being installed is restricted to one direction.

A configuration also may be adopted in which, for example, two of the four casters 30 are aligned to be oriented to a common direction, and the remaining two casters 30 are aligned to be oriented to a direction orthogonal to (intersecting with) the common direction. This configuration can restrict movement itself of the image forming apparatus 1 after being installed. Furthermore, disposing the four casters 30 so that they are all different in orientation also can restrict movement itself of the image forming apparatus 1 after being installed.

In this embodiment, as described above, the swiveling restriction portion 41 that restricts swiveling of the nut portion 32c is formed integrally with each of the cover member 40 and the extension cover member 45. Thus, by mounting the cover member 40 (or both of the cover member 40 and the extension cover member 45) to the apparatus main body 1a, swiveling of the nut portion 32c can be restricted, so that swiveling of the wheel 31 can be restricted.

Furthermore, the swiveling restriction portion 41 is formed integrally with each of the cover member 40 and the extension cover member 45, thus preventing the number of components of a member for restricting swiveling of the wheel 31 from being increased.

Furthermore, as described above, the caster 30 includes the bolt portion 33 that is fastened to the upper part of the main body portion 32 and extends in the up-and-down direction and the nut 34 that is rotatably mounted around the bolt portion 33 so as to be movable in the up-and-down direction and supports the apparatus main body 1a. Thus, a height of the apparatus main body 1a can be changed.

Furthermore, as described above, the nut 34 is disposed at the uppermost part or the lowermost part in the prescribed region of the screw portion 33a in which the nut 34 is movable in the up-and-down direction, and thus the nut 34 can be fastened firmly to the bolt portion 33.

Furthermore, as described above, in a case where the nut 34 is disposed at the lowermost part in the prescribed region, swiveling of the nut portion 32c is restricted by the swiveling restriction portion 41 of the cover member 40. In a case where the nut 34 is disposed at the uppermost part in the prescribed region, the extension cover member 45 is disposed below the cover member 40, and swiveling of the nut portion 32c is restricted by the swiveling restriction portion 41 of the extension cover member 45. Thus, even in a case of changing a height of the apparatus main body 1a, the cover member 40 still can be used.

Furthermore, as described above, after the nut 34 is mounted around the screw portion 33a of the bolt portion 33, the lower end part of the screw portion 33a is fastened to the nut portion 32c, and thereby the caster 30 can be easily assembled.

Furthermore, as described above, the swiveling restriction portion 41 protrudes from each of the cover member 40 and the extension cover member 45 toward the inner side of the apparatus main body 1a and is formed in such a substantially U-shape as to hold, from both sides, the side surfaces of the nut portion 32c. Thus, swiveling of the nut portion 32c can be easily restricted by the swiveling restriction portion 41, so that swiveling of the wheel 31 can be easily restricted.

The embodiment disclosed herein is to be construed in all respects as illustrative and not limiting. The scope of the present disclosure is indicated by the appended claims rather than by the foregoing description of the embodiment, and all changes that come within the meaning and range of equivalency of the claims are intended to be embraced therein.

For example, while an example has been shown in which the present disclosure is applied to a monochrome copy machine, the present disclosure is not limited thereto. Needless to say, the present disclosure is applicable to various types of image forming apparatuses each provided with a caster that movably supports an apparatus main body, such as a color copy machine, a monochrome printer, a color printer, a digital multi-functional peripheral, a facsimile, and so on.

Furthermore, while the above-described embodiment has shown an example in which the nut 34 is disposed at the uppermost part or the lowermost part in the prescribed region of the screw portion 33a in which the nut 34 is movable in the up-and-down direction, the present disclosure is not limited thereto. The nut 34 may be disposed at a mid-position in the prescribed region of the screw portion 33a. In this case, it is appropriate that a still another swiveling restriction portion 41 be further provided below the swiveling restriction portion 41 shown in FIG. 6.

Furthermore, while the above-described embodiment has shown an example having a configuration in which the nut 34 is provided so that a height of the apparatus main body 1a can be changed, the present disclosure is not limited thereto, and a configuration also may be adopted in which a height of the apparatus main body 1a cannot be changed. In this case, without providing the nut 34, the support member 35 may be placed on the nut portion 32c.

What is claimed is:

1. An image forming apparatus, comprising:
   an apparatus main body;
   a caster that movably supports the apparatus main body; and
   a cover member that is mounted to a side surface of the apparatus main body, wherein
   the caster comprises:
      a wheel; and
      a main body portion that swivelably supports a rotation shaft of the wheel,
   a nut portion that has a polygonal shape in a planar view is provided integrally with an upper part of the main body portion, and
   a swiveling restriction portion that restricts swiveling of the nut portion is formed integrally with the cover member.

2. The image forming apparatus according to claim 1, wherein
   the caster further comprises:
      a bolt portion that is fastened to the upper part of the main body portion and extends in an up-and-down direction; and
      a nut that is rotatably mounted around the bolt portion so as to be movable in the up-and-down direction and supports the apparatus main body.

3. The image forming apparatus according to claim 2, wherein
   the bolt portion has, at a part thereof, a screw portion that has a screw thread formed thereon, and
   the nut is movable in the up-and-down direction in a prescribed region of the screw portion and is disposed at an uppermost part or a lowermost part in the prescribed region to support the apparatus main body.

4. The image forming apparatus according to claim 3, wherein
   the cover member comprises:
      a first cover member with which a swiveling restriction portion is integrally formed, in a case where the nut is disposed at the lowermost part in the prescribed region, the swiveling restriction portion restricting swiveling of the nut portion; and a second cover member with which a swiveling restriction portion is integrally formed, in a case where the nut is disposed at the uppermost part in the prescribed region, the second cover member being disposed below the first cover member, and the swiveling restriction portion restricting swiveling of the nut portion.

5. The image forming apparatus according to claim 3, wherein the bolt portion comprises:

the screw portion; and a non-screw portion that is disposed on an upper side of the screw portion and has no screw thread formed thereon, and a lower end part of the screw portion is fastened to the nut portion.

6. The image forming apparatus according to claim 1, wherein the swiveling restriction portion protrudes from the cover member toward an inner side of the apparatus main body and is formed in such a substantially U-shape as to hold, from both sides, side surfaces of the nut portion.

\* \* \* \* \*